Figure 1:
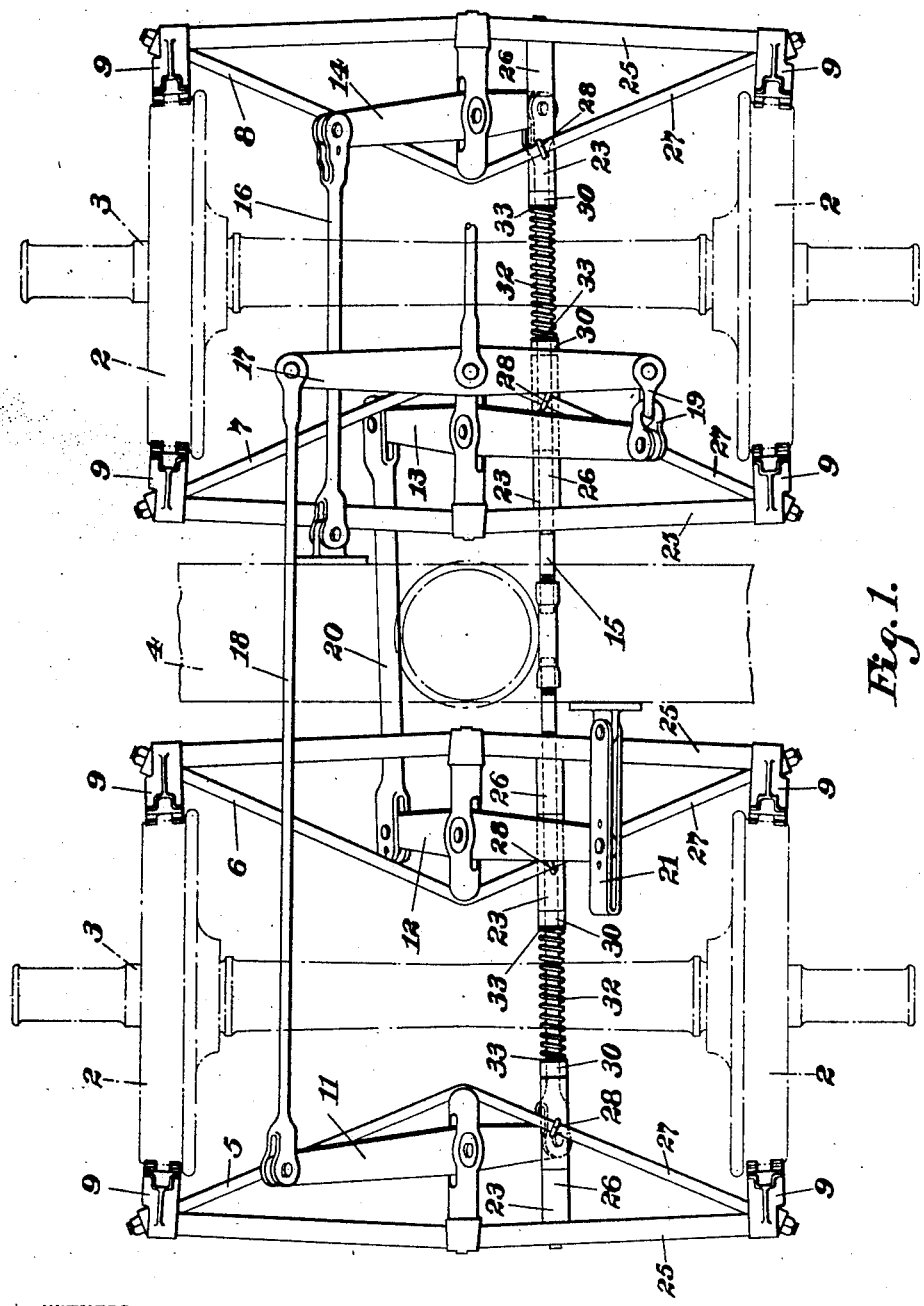

Nov. 27, 1923.    1,475,658
J. F. STREIB
BRAKE SUPPORTING AND RELEASING MECHANISM
Filed Jan. 13, 1922    2 Sheets-Sheet 1

WITNESS    INVENTOR,
Edythe Lamb    John F. Streib,
By    Attorney.

Nov. 27, 1923.  1,475,658
J. F. STREIB
BRAKE SUPPORTING AND RELEASING MECHANISM
Filed Jan. 13, 1922    2 Sheets-Sheet 2
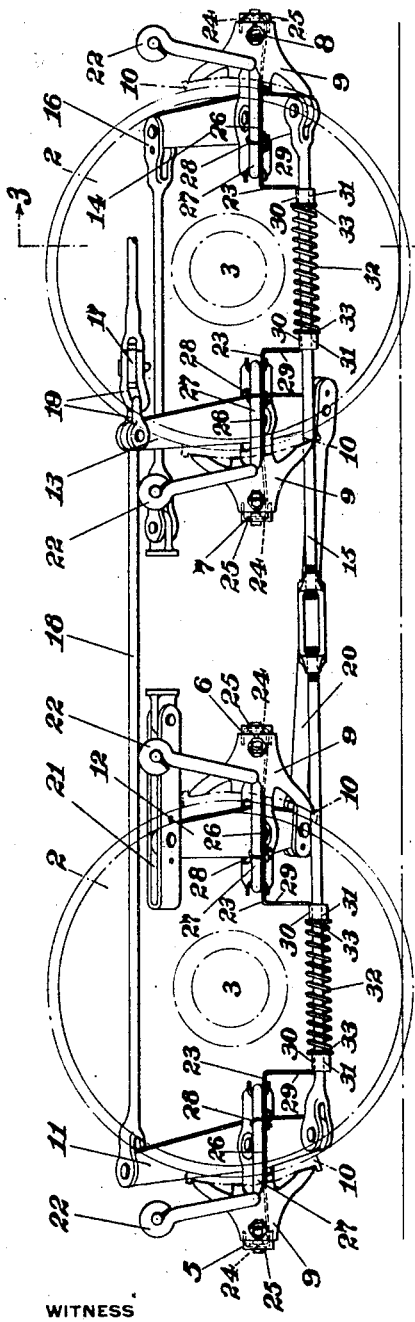
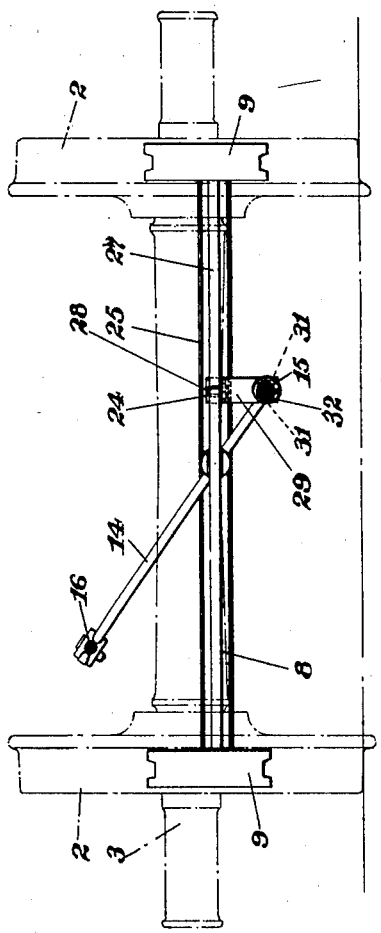
INVENTOR,
John F. Streib, Patented Nov. 27, 1923.

1,475,658

UNITED STATES PATENT OFFICE.

JOHN F. STREIB, OF AVALON, PENNSYLVANIA, ASSIGNOR TO PRESSED STEEL CAR COMPANY, OF PITTSBURGH, PENNSYLVANIA, A CORPORATION OF NEW JERSEY.

BRAKE SUPPORTING AND RELEASING MECHANISM.

Application filed January 13, 1922. Serial No. 528,895.

*To all whom it may concern:*

Be it known that I, JOHN F. STREIB, a citizen of the United States, residing in Avalon, in the county of Allegheny and State of Pennsylvania, have invented certain new and useful Improvements in Brake Supporting and Releasing Mechanism, of which the following is a specification.

This invention relates to railway car brakes and more particularly to what is known as a leveling device for brake beams and release mechanism for such brakes.

An object of the invention is to provide means whereby the brake beams of a railway car brake are maintained in substantially fixed angular relation to the wheels thus preventing accidental canting of the beams when the braking power is released and the consequent uneven wearing of the shoes on the wheels.

Another object of the invention is to provide a brake beam with means adapted to cooperate with a brake rod to prevent the beam from canting accidentally when the beams are in released position.

A further object of the invention is to provide a brake beam and brake rod with cooperating means whereby the beams are caused to move in the direction away from the wheels when the braking power is released.

These and other objects will be apparent from the following description.

Referring now to the drawings in which like reference characters refer to like parts, Fig. 1 is a plan view of a brake mechanism embodying the invention; Fig. 2, is a side elevational view of the same and Fig. 3, is a cross-sectional view of the same taken on the line 3—3 of Fig. 2.

Referring now in detail to the drawings the reference character 2 indicates the wheels of a railway car truck, which are mounted on axles 3 such axles being suitably mounted in the truck frame (not shown) and 4 indicates the bolster or transom of the truck.

The brake mechanism comprises brake beams 5, 6, 7 and 8, each of which at each end is provided with a brake head 9 and shoe 10. The beams 5 and 6 are arranged at opposite sides of one pair of wheels so that the shoes attached to the beams will be adapted to engage opposite sides of this pair of wheels while the beams 7 and 8 are arranged at the opposite sides of another pair of wheels so that the shoes 10 attached to the beams will be adapted to engage the opposite sides of the wheels of this pair. These beams 5, 6, 7, and 8 are provided with levers 11, 12, 13 and 14 respectively, each of which levers is pivotally connected with its respective beam. The lower ends of the levers 11 and 14 are connected together through the medium of a rod 15 which may comprise a plurality of connected pieces, as illustrated in the drawings, or may comprise a single piece. The upper end of the lever 14 is fulcrumed to the bolster 4 by means of a fulcrum member 16, one end of which is connected with the bolster and the opposite end with the upper end of this lever. The upper end of the lever 11 is connected with one end of an equalizer lever 17 through the medium of a rod 18, the opposite end of such equalizer lever being connected with the upper end of the lever 13 through the medium of links 19. The lower end of this lever is connected with the lower end of the lever 12 through the medium of a rod 20, the upper end of this lever 12 being connected with one end of a fulcrum member 21, the opposite end of which is secured to the bolster.

Adjacent each end of each brake beam a hanger 22 is provided the upper end portion of which is pivotally connected with the truck frame and the lower end portion is pivotally connected with the brake head 9. These hangers support the brake as a whole from the truck frame.

Each of these brake beams 5, 6, 7 and 8 is provided with a member 23 which is located preferably near the center of the length of the beam and which is adapted to cooperate with the rod 15 to support the beam in such a manner as to prevent accidental canting thereof when the beam is in its released position or is being moved to such position. This member 23 comprises a flange 24 which is preferably secured to the web of the compression member 25 of the beam, a horizontally disposed portion 26 which is secured to the tension member 27 of the beam by a U bolt 28 or other suitable means and further comprises a downwardly extending portion 29 having its lower end portion bent outwardly at an angle thereto and forming a shoe 30 which slidably engages the rod 15 so that relative movement between the shoe and rod is permitted. This shoe is preferably provided with downwardly extending flanges 31 which are adapted to engage the rod 15 and thus prevent the disengagement of the shoe with the rod due to excessive sidewise movement of the shoe or rod.

Between each pair of brake beams the rod 15 is provided with a spring 32 the ends of which are adapted to seat against washers 33 with which the ends of the shoes 30 of adjacent beams are adapted to engage so that when the braking power is applied, the movement of the brake beams in directions toward the wheels and toward each other will cause the spring 32 to be compressed and when the braking power is released this spring so compressed will force the brake beams in directions away from the wheels and away from each other and will at the same time cause the operating rods and levers to move to their released positions. It will be understood that the washers 33 may be omitted if desired and the ends of the spring made to engage the members 23 direct.

It will be apparent to those skilled in the art to which this invention appertains that many changes may be made in the form and arrangement of the several parts of this device without departing from the spirit and scope of the appended claims.

Having thus described the invention what I claim as new and desire to secure by Letters Patent is:

1. In a brake mechanism, a brake beam, a power transmitting brake rod, and means on said beam adapted to rest on said rod and prevent canting of said beam when the braking power is released, said rod and means being movable independently of each other.

2. In a brake mechanism, a brake beam, a power transmitting brake rod, and a member secured to said beam adapted to slidably rest on said rod to support said beam in fixed angular relation to said wheel when the beam is in released position.

3. In a brake mechanism, a brake beam, a power transmitting brake rod, and means on said beam adapted to slidably engage said rod and prevent canting of the beam when in released position.

4. In a brake mechanism, a brake beam, a power transmitting brake rod beneath said beam, and means secured to said beam and extending downwardly into supporting engagement with said rod to prevent said beam from canting when it is in released position, said rod and means being free to move independently of each other when said brake is operated.

5. In a brake mechanism, a brake beam comprising tension and compression members, a power transmitting brake rod arranged in a plane below said beam, and a member secured to said tension and compression members having a portion adapted to slidably engage said rod.

6. In a brake mechanism, a brake beam, a power transmitting brake rod, means on said beam adapted to slidably engage said rod to support said beam when in released position and means on said rod adapted to engage said member to move said beam to released position.

7. In a brake mechanism, a power transmitting brake rod, a pair of brake beams having shoes adapted to engage the opposite sides of a pair of wheels, a member secured to each of said beams adapted to engage said rod, and means on said rod adapted to engage said members and move said beams in opposite directions to release positions.

8. In a brake mechanism, brake beams arranged on opposite sides of a pair of wheels, a power transmitting brake rod adjacent said beams, means for supporting said beams from said rod, and means on said rod for moving said beams to released position when the braking power is released.

9. In a brake mechanism, brake beams arranged on opposite sides of a pair of wheels, a power transmitting brake rod, a spring mounted on said rod, and means on said beams adapted to engage said spring.

10. In a brake mechanism, brake beams arranged on opposite sides of a pair of wheels, a power transmitting brake rod, a spring mounted on said rod between said beams, and means on said beams adapted to engage with said rod and spring.

11. In a car truck, a plurality of pairs of wheels, brake beams arranged on opposite sides of each pair of wheels, a brake rod, means for supporting said beams from said rod and means on said rod adapted to engage the first mentioned means and move said beams to released position when the braking power is released.

In testimony whereof I affix my signature in the presence of two witnesses.

JOHN F. STREIB.

Witnesses:
  J. J. CLARKE,
  ALICE SMITH.